(12) United States Patent
Ochiai

(10) Patent No.: US 11,937,592 B2
(45) Date of Patent: Mar. 26, 2024

(54) WATERPROOF STRUCTURE AND SPINNING REEL

(71) Applicant: Shimano Inc., Sakai (JP)

(72) Inventor: Koji Ochiai, Sakai (JP)

(73) Assignee: Shimano Inc., Sakai (JP)

(*) Notice: Subject to any disclaimer, the term of this patent is extended or adjusted under 35 U.S.C. 154(b) by 0 days.

(21) Appl. No.: 17/873,075

(22) Filed: Jul. 25, 2022

(65) Prior Publication Data
US 2023/0101950 A1  Mar. 30, 2023

(30) Foreign Application Priority Data
Sep. 29, 2021 (JP) .................................. 2021-159003

(51) Int. Cl.
*A01K 89/01* (2006.01)
*A01K 89/015* (2006.01)

(52) U.S. Cl.
CPC .. *A01K 89/01928* (2015.05); *A01K 89/01929* (2015.05)

(58) Field of Classification Search
CPC ...... A01K 89/01121; A01K 89/011221; A01K 89/011222; A01K 89/011223; A01K 89/01928; A01K 89/01929; A01K 89/0193
See application file for complete search history.

(56) References Cited

U.S. PATENT DOCUMENTS

| | | | | |
|---|---|---|---|---|
| 2002/0096587 A1* | 7/2002 | Ikuta | ............... | A01K 89/011221 242/246 |
| 2013/0206889 A1* | 8/2013 | Ochiai | ................... | F16J 15/324 277/549 |
| 2016/0106083 A1* | 4/2016 | Niitsuma | ......... | A01K 89/01928 242/310 |
| 2018/0055026 A1* | 3/2018 | Ochiai | ................... | A01K 89/05 |
| 2020/0196585 A1* | 6/2020 | Ochiai | ................ | A01K 89/006 |

FOREIGN PATENT DOCUMENTS

| | | | | |
|---|---|---|---|---|
| CN | 104686464 A * | 6/2015 | ............. | A01K 89/01 |
| EP | 2625954 A1 * | 8/2013 | ............. | A01K 89/00 |
| JP | 5961407 B2 | 8/2016 | | |
| JP | 6261971 B2 | 1/2018 | | |

* cited by examiner

*Primary Examiner* — Emmanuel M Marcelo
(74) *Attorney, Agent, or Firm* — United IP Counselors, LLC

(57) ABSTRACT

A waterproof structure is provided on a spinning reel including a reel main body, a cylindrical member disposed on an outer periphery of a spool shaft and a rotor disposed at a front of the cylindrical member in the reel main body. The waterproof structure includes a seal member which waterproofs the entire circumference in the area between the cylindrical member and the rotor. The seal member includes a main lip that is in liquid-tight contact at a contact portion in the axial direction of the spool shaft. An annular wall portion is disposed on at least one of the rotor or the cylindrical member. The annular wall portion covers the contact portion at the entire circumference of an outer peripheral side of the contact portion.

10 Claims, 5 Drawing Sheets

WATERPROOF STRUCTURE AND SPINNING REEL

CROSS-REFERENCE TO RELATED APPLICATIONS

This application claims priority to Japanese Patent Application No. 2021-159003, filed Sep. 29, 2021. The contents of that application are incorporated by reference herein in their entirety.

TECHNICAL FIELD

The present invention relates to a waterproof structure and a spinning reel.

BACKGROUND ART

A waterproof structure for a conventional spinning reel typically includes a cylindrical member fitted to the outer periphery of a spool shaft provided in a reel main body and a rotor provided at the front of the cylindrical member, and a lip seal of a seal member that waterproofs the entire circumference in the area between the cylindrical member and the rotor is in liquid-tight contact with the rotor in the radial direction perpendicular to the spool shaft (see Japanese Patent No. 5961407 and Japanese Patent No. 6261971).

In the conventional configuration with a lip seal extended in radial direction, elastic deformation amount (tension) of a lip is increased so as to contact the target object in order to prevent waterproof property to deteriorate due to displacement between the attached members. This increases friction torque and reduces rotation efficiency, and thus, there is a room for improvement in this respect.

The present invention has been made in consideration of such circumstances and the object of the present invention is to provide a waterproof structure and a spinning reel that suppress the increase in torque acting on the spinning reel due to a waterproof seal by suppressing the influence of displacement and also reducing water pressure acting on a main lip itself, thereby reducing torque.

BRIEF SUMMARY

A waterproof structure according to one aspect of the present invention is installed in a spinning reel which includes a cylindrical member disposed on an outer periphery of a spool shaft in a reel main body, and a rotor disposed at a front of the cylindrical member. The waterproof structure includes a seal member that waterproofs an entire circumference in an area between the cylindrical member and the rotor, and the seal member has a main lip that is in liquid-tight contact at a contact portion in an axial direction of the spool shaft. An annular wall portion is disposed on at least one of the rotor or the cylindrical member. The annular wall portion covers the contact portion at an entire circumference of an outer peripheral side of the contact portion.

According to the waterproof structure of the present invention, since the main lip of the seal member and the rotor are brought into liquid-tight contact with each other in the axial direction and the annular wall portion disposed on the outer peripheral side of the contact portion forms a labyrinth, water pressure is less likely to act on the main lip, and thus, eliminating the need to increase elastic deformation amount of the lip. For this reason, it is possible to suppress the increase in torque acting on the spinning reel due to a waterproof seal, thereby reducing torque.

Also, the present invention does not require accuracy in centering of the seal member while assembling a reel, as in the conventional case where the main lip of the seal member makes contact in the radial direction. In addition, it is possible to prevent problems such as decreased waterproof property when the seal member deviates from the predetermined position, and thus, the assembly efficiency can be improved.

It is preferable to provide an auxiliary lip extending in the axial direction of the spool shaft in a state in which a gap is provided with respect to the rotor between the contact portion and the annular wall portion in the seal member.

In this case, the auxiliary lip provided between the main lip and the annular wall portion further prevents water pressure from acting on the main lip, and thus, improves waterproof performance.

A region surrounded by the main lip, the auxiliary lip, and the rotor may be filled with lubricant.

In this case, since lubricant is filled in the region, it is possible to increase rotation efficiency and reduce even more torque, thereby, waterproof performance is improved.

A surface of the annular wall portion may be water-repellent.

In this case, it is possible to prevent water from entering the inner peripheral side due to the water-repellent effect of the annular wall portion, and thus, water pressure can be made even more difficult to act on the main lip.

The main lip may extend gradually from a radially inner side to a radially outer side towards the rotor in the axial direction.

In this case, the distal end of the main lip, in other words, the position contacting the rotor, is arranged towards the radially outer side relative to the base end, therefore, water pressure resistance of the main lip can be increased.

The spinning reel according to one aspect of the present invention includes the waterproof structure described above.

With the present invention, the spinning reel having the above-described effects of the waterproof structure can be provided.

According to the waterproof structure and the spinning reel of the present invention, it is possible to suppress the increase in torque acting on the spinning reel due to the waterproof seal by suppressing the influence of displacement and reducing water pressure acting on the main lip itself, thereby reducing torque.

DETAILED DESCRIPTION

Hereinafter, an embodiment of a waterproof structure and a spinning reel according to the present invention will be described with reference to the drawings. In each drawing, the scale of each component may be changed as needed to make each component visually recognizable.

Figure 1:
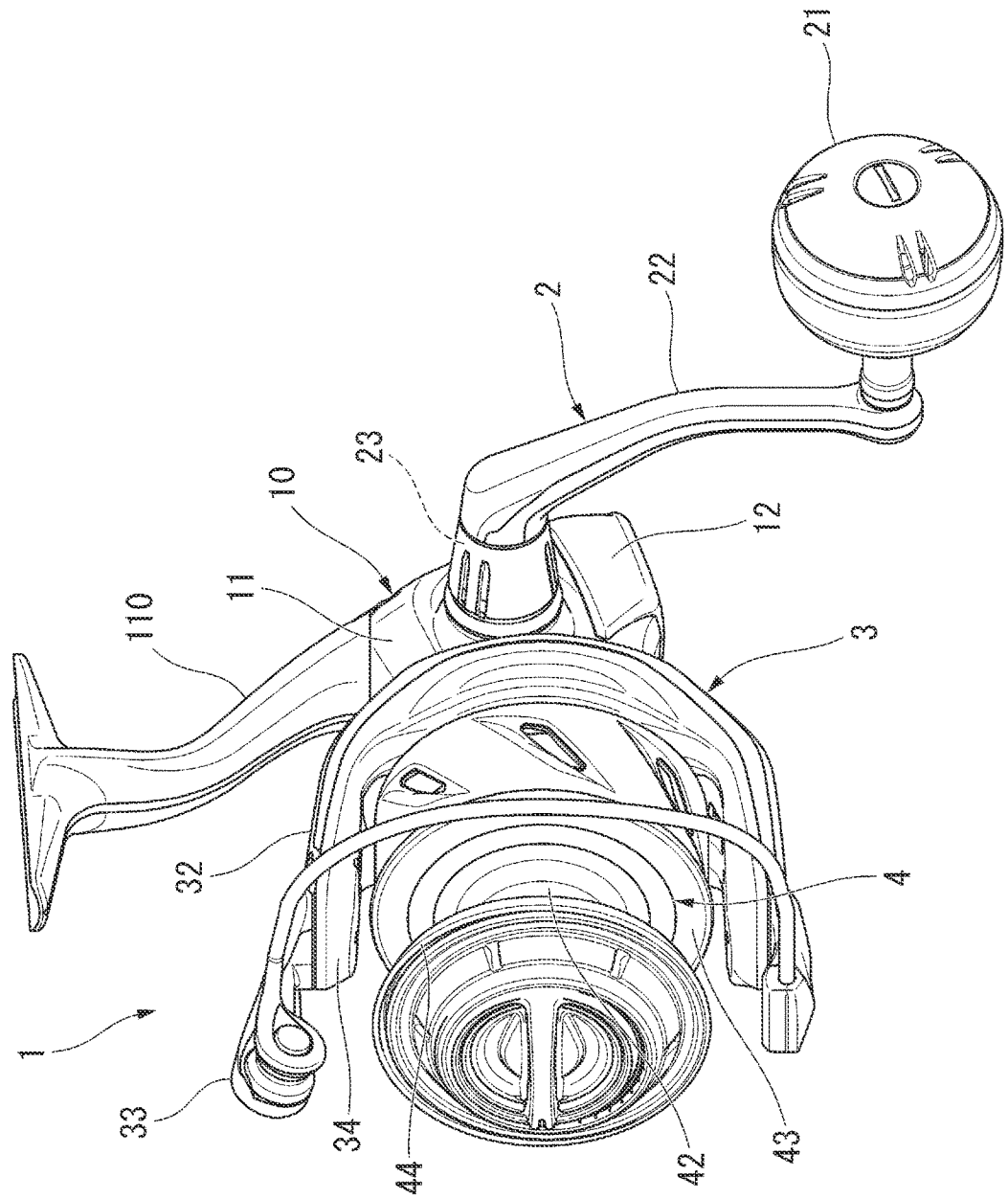
FIG. 1 is a perspective view showing the overall structure of a spinning reel according to an embodiment of the present invention.
Figure 2:
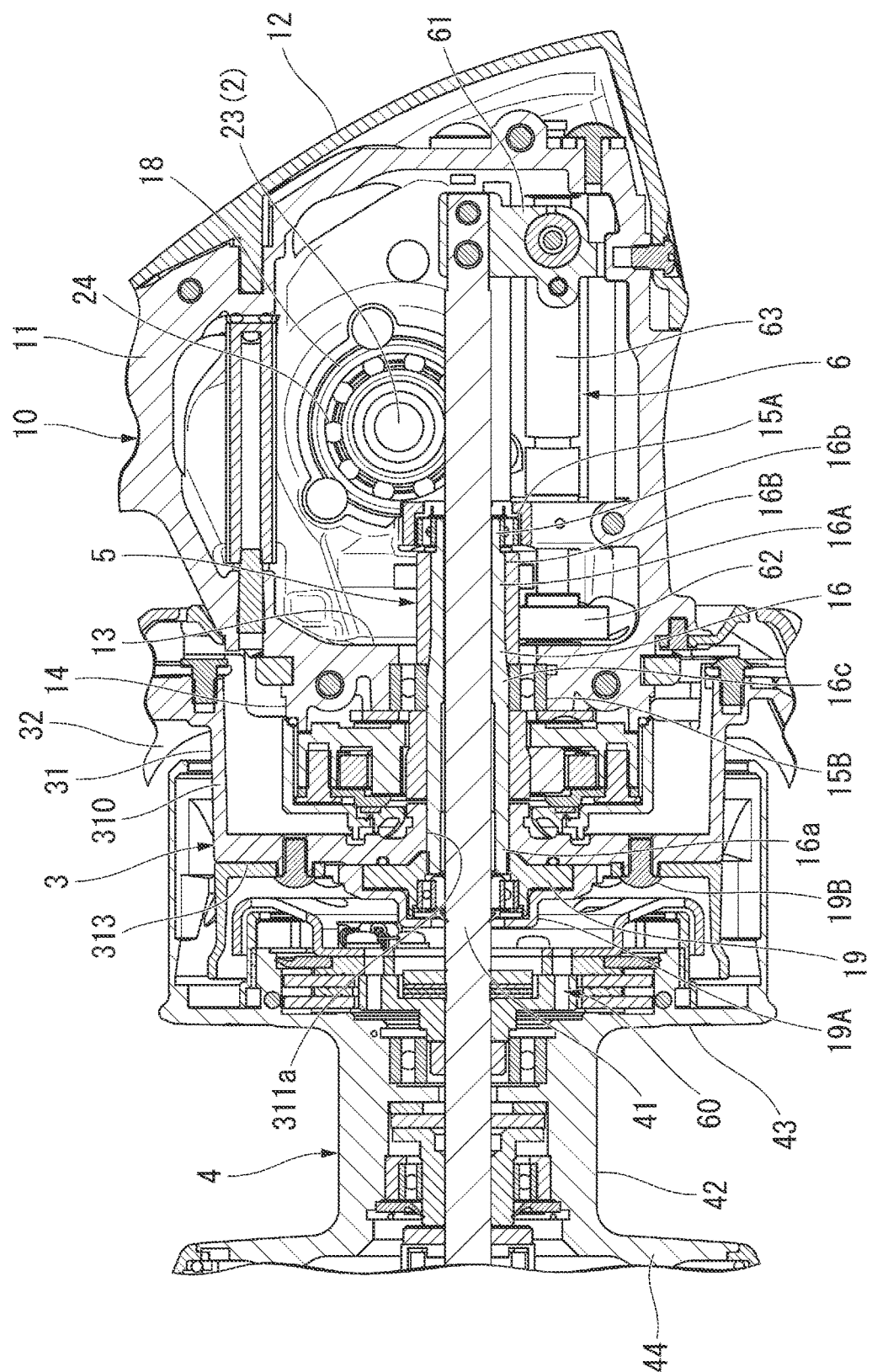
FIG. 2 is a cross-sectional view of the spinning reel shown in FIG. 1 from the left side.

As shown in FIGS. 1 and 2, a spinning reel 1 of this embodiment includes a reel main body 10, a handle 2 rotatably supported by the reel main body 10, a rotor 3, and a spool 4.

The rotor 3 is rotatably supported at the front of the reel main body 10. The spool 4 winds a fishing line around the outer periphery thereof and is disposed at the front of the rotor 3 so as to be movable back and forth. In FIG. 1, the handle 2 is attached to the left side of the reel main body 10 in an operation state. The handle 2 can be attached to either side of the reel main body 10.

The handle 2 includes a handle grip 21 and a handle arm 22 to which the handle grip 21 is rotatably attached at the distal end thereof. At the base end of the handle arm 22, a handle shaft 23 (described below) is non-rotatably attached. The handle shaft 23 extends in the direction intersecting with the handle arm 22.

The reel main body 10 includes a reel body 11 having a space inside thereof, and a lid member 12 detachably attached to the reel body 11 for closing the space of the reel body 11.

The reel body 11 is made of aluminum alloy, for example, and has a T-shaped rod-attaching leg 110 at the upper part thereof. The T-shaped rod-attaching leg 110 is integrally formed with the reel body 11 and extends to the front and rear. As shown in FIG. 2, a rotor drive mechanism 5 that rotates the rotor 3 in conjunction with the rotation of the handle 2, and an oscillating mechanism 6 for moving the spool 4 back and forth to wind the fishing line evenly, are provided inside of the space of the reel body 11.

A circular flange 13 is formed at the front end of the reel body 11 and the lid member 12. The lid member 12 is made of aluminum alloy, for example, and is screwed onto the reel body 11 at a plurality of locations.

A tubular portion 14 is provided on the front surface of the flange 13. The tubular portion 14 is formed with the outer peripheral part of the flange 13 protruding towards the front thereof.

A spool shaft 41 of the spool 4 (described below) extends through the reel body 11. The reel body 11 houses a first bearing 15A rotatably supporting the rear end portion of the spool shaft 41 from the front. Also, circular through holes (not shown), through which the handle shaft 23 can be inserted, are formed in the reel body 11 and the lid member 12, respectively. Around the through holes on the inner side surfaces of the reel body 11 and the lid member 12, rolling bearings 24 rotatably supporting the handle shaft 23 are housed.

As shown in FIGS. 1 and 2, the rotor 3 includes a rotor body 31, bail arms 32 attached so as to be swingable between a line releasing posture and a line winding posture at the distal end of the rotor body 31, and a bail reverse mechanism 33 attached to the rotor body 31 for bringing the bail arms 32 back from the line releasing posture to the line winding posture.

As shown in FIG. 2, the rotor body 31 includes a cylindrical portion 310 attached to the reel body 11 so as to be rotatable around the spool shaft 41. As shown in FIG. 1, the bail arms 32 are provided so as to face each other on the sides of the cylindrical portion 310. The cylindrical portion 310 and the bail arms 32 are made of aluminum alloy, for example, and integrally formed. Between the distal ends of the bail arms 32 that face each other, a bail 34 in the form of substantially U-shaped curved piece of wire, that guides the fishing line to the spool 4, is fixed.

Figure 3:
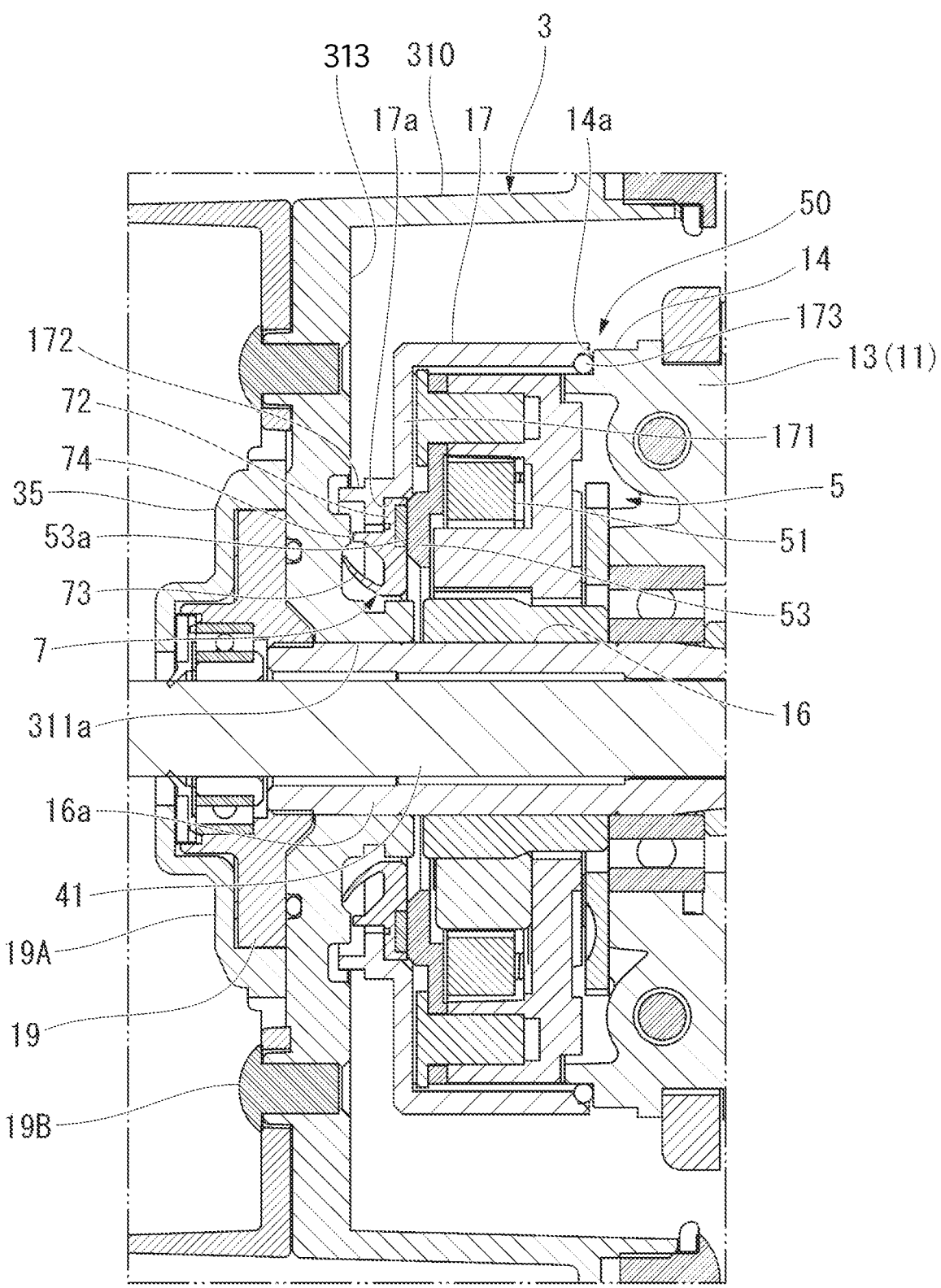
FIG. 3 is a cross-sectional view showing the main part of the internal configuration of the reel shown in FIG. 2.

As shown in FIG. 3, a front wall 313 is formed at the front of the cylindrical portion 310. In the center of the front wall 313, a through hole 311a is formed, and a front portion 16a of a pinion gear 16 and the spool shaft 41 penetrate the through hole 311a. A rotor fixing cover 35 for fixing the rotor 3 is arranged at the front of the front wall 313.

A reverse rotation preventing mechanism 50 to prohibit and release the reverse rotation of the rotor 3 is arranged inside of the cylindrical portion 310 of the rotor 3.

The reverse rotation preventing mechanism 50 includes a roller clutch 51 and a stopper knob (not shown). The roller clutch 51 is a roller type one-way clutch attached to the inner peripheral part of the tubular portion 14 of the reel body 11. The stopper knob is arranged at the lower part of the reel body 11 and switches the roller clutch 51 between an activated state and a deactivated state. The outer ring of the roller clutch 51 is attached to the front surface side of the tubular portion 14 and the inner ring of the roller clutch 51 is attached to the outer peripheral part of the pinion gear 16. Here, by pivoting the stopper knob to the left or right, the roller clutch 51 is switched between the activated state and the deactivated state.

As shown in FIG. 1, the spool 4 is disposed between the facing bail arms 32 of the rotor 3 and attached to the distal end of the spool shaft 41 via a drag mechanism 60 (see FIG. 2). The spool 4 includes a spool body portion 42 around which the fishing line is wound on the outer periphery thereof, a skirt 43 integrally formed at the rear of the spool body portion 42, and a flange 44 integrally formed at the front end of the spool body portion 42.

As shown in FIG. 2, the rotor drive mechanism 5 includes the handle shaft 23 to which the handle 2 is non-rotatably attached, a drive gear 18 which rotates with the handle shaft 23, and the pinion gear 16 that meshes with the drive gear 18.

The pinion gear 16 is made of stainless alloy and has a cylindrical-shape. The front portion 16a of the pinion gear 16 penetrates the center of the rotor 3. The pinion gear 16 is fixed to the rotor 3 by a nut member 19. A rear portion 16b and an intermediate portion 16c of the pinion gear 16 are rotatably supported by the reel main body 10 via the first bearing 15A and a second bearing 15B that are respectively rolling bearings.

The pinion gear 16 is attached to the reel main body 10 so as to be rotatable around an axis along the axial direction of the fishing rod. The front portion 16a of the pinion gear 16 penetrates the center (through hole 311a) of the rotor 3, and the pinion gear 16 is fixed to the rotor 3 by the nut member 19. The pinion gear 16 includes a cylindrical portion 16A and a tooth part 16B. The spool shaft 41 penetrates through the inner periphery of the cylindrical portion 16A with a gap therebetween. The tooth part 16B is arranged on the rear outer periphery of the cylindrical portion 16A and meshes with the drive gear 18. The outer periphery of the front portion 16a of the cylindrical portion 16A of the pinion gear 16 is non-rotatably attached to the rotor 3.

The cylindrical portion 16A of the pinion gear 16 is a cylindrical-shaped member made of stainless alloy, and the rear portion 16b and the intermediate portion 16c thereof are rotatably supported by the reel main body 10 via the first bearing 15A and the second bearing 15B, respectively. The spool shaft 41 penetrates through inside of the cylindrical portion 16A. The gap is formed between the cylindrical portion 16A and the spool shaft 41.

The tooth part 16B is helically formed on the outer periphery between the rear portion 16b and the intermediate portion 16c of the cylindrical portion 16A, and meshes with the drive gear 18. The tooth part 16B also meshes with an intermediate gear of the oscillating mechanism 6 (described below).

A male screw part is formed on the outer peripheral surface of the front portion 16a of the pinion gear 16, and the nut member 19 is screwed onto the male screw part. The nut member 19 is held in place by a retainer 19A. The retainer 19A is fixed by a plurality of screw members 19B attached to the front wall 313 of the rotor 3 from the front (see FIG. 3).

The spool shaft 41 is a shaft member made of stainless alloy. The spool 4 is connected via the drag mechanism 60 at the front end thereof, and a slider 61 of the oscillating mechanism 6 (described below) is fixed to the rear end thereof. The spool shaft 41 penetrates through the inner peripheral part of the pinion gear 16. The outer periphery of the spool shaft 41 that is forward of the front portion 16a of the cylindrical portion 16A is rotatably supported by a third bearing 15C. The third bearing 15C is a rolling bearing attached to the outer periphery of the spool shaft 41.

The oscillating mechanism 6 is a mechanism for moving the spool shaft 41 connected to the center of the spool 4 via the drag mechanism 60 in the front-rear direction so as to move the spool 4 in the same direction. The oscillating mechanism 6 is a traverse cam type and includes an intermediate gear 62, a screw shaft 63, and the slider 61. The intermediate gear 62 meshes with the tooth part 16B of the pinion gear 16. The screw shaft 63 is attached to the reel body 11 so as to be rotatable around the axis parallel to the spool shaft 41. The slider 61 moves back and forth due to the rotation of the screw shaft 63. The rear end portion of the spool shaft 41 is attached to the slider 61 in a non-rotatable and axially non-movable manner.

A disc-shaped attachment plate 53 is coaxially provided with the spool shaft 41 on the front surface of the roller clutch 51. A seal member 7 to waterproof the roller clutch 51 is attached to a front surface 53a of the attachment plate 53. That is, the seal member 7 waterproofs the entire circumference in the area between the pinion gear 16 and the rotor 3.

A bottomed cylinder-shaped cover member 17 (cylindrical member) to cover the front side of the roller clutch 51 is attached to a front end portion 14a of the tubular portion 14 of the reel body 11, via a first water stop ring 173 that is a synthetic resin O-ring.

Figure 4:
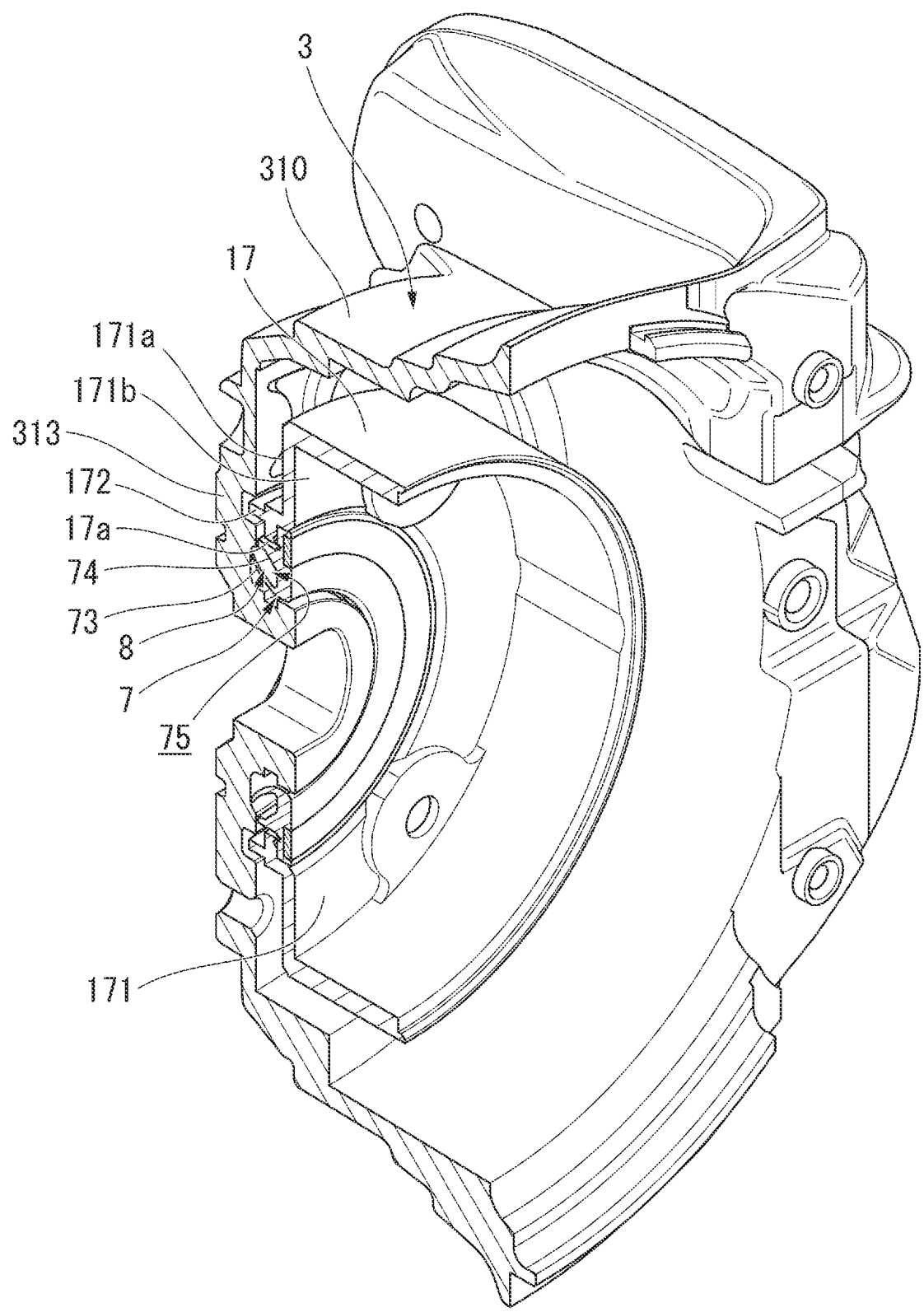
FIG. 4 is a partial perspective view showing the main part of a waterproof structure.
Figure 5:
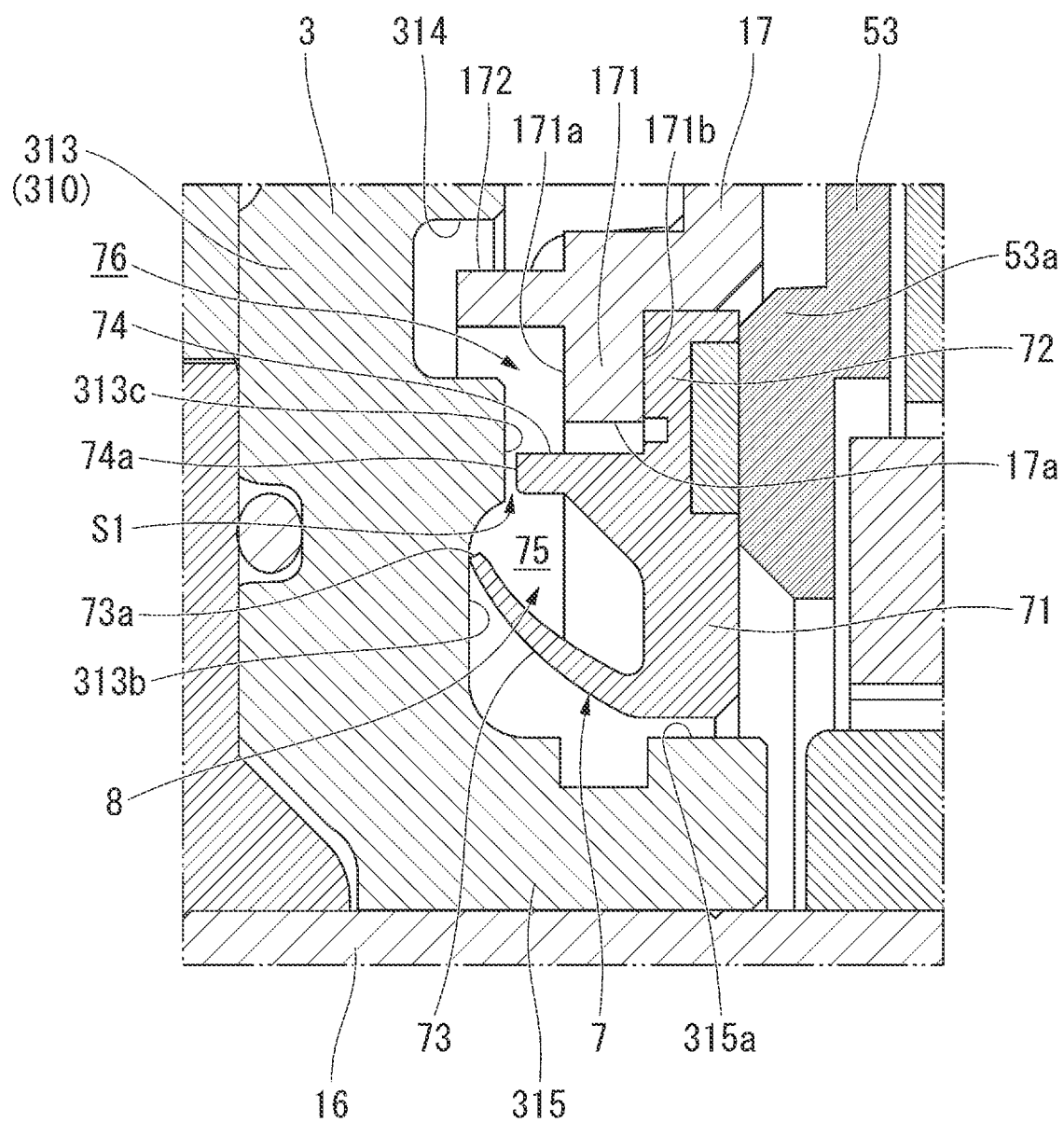
FIG. 5 is a cross-sectional view showing the main part of the waterproof structure shown in FIG. 3.

As shown in FIG. 4, a through hole 17a through which the spool shaft 41 and the pinion gear 16 are inserted is formed at the center of a bottom wall 171 of the cover member 17. As shown in FIG. 5, the seal member 7 is fixed by sandwiching a seal base end 72 of the seal member 7 by a rear surface 171b of the bottom wall 171 of the cover member 17 and the front surface 53a of the attachment plate 53.

The cover member 17 includes a cylindrical annular wall portion 172 protruding towards the front from a front surface 171a of the bottom wall 171. The annular wall portion 172 is arranged to enter a recessed groove 314 formed to be annularly recessed into a rear surface 313b of the front wall 313 of the cylindrical portion 310 in the rotor 3 so as to form a labyrinth structure. That is, the recessed groove 314 and the annular wall portion 172 form a labyrinth structure, and thus, the structure is designed to prevent water from seeping into the interior of the radially inner side than the annular wall portion 172. The surface of the annular wall portion 172 may be water-repellent. It is more effective as a labyrinth structure due to the water-repellent annular wall portion 172.

The seal member 7 is a lip member made of elastic synthetic resin, such as nitrile rubber, for example. As shown in FIGS. 4 and 5, the seal member 7 includes a seal body 71, the seal base end 72, a main lip 73, and an auxiliary lip 74. The seal base end 72 is arranged on the outer peripheral side of the seal body 71 and sandwiched between the bottom wall 171 of the cover member 17 and the front surface 53a of the attachment plate 53. The main lip 73 extends from the seal body 71 towards the front. The auxiliary lip 74 is arranged on the outer peripheral side of the main lip 73 and extends from the seal body 71 towards the front. The seal body 71, the seal base end 72, the main lip 73, and the auxiliary lip 74 are integrally formed with each other.

As shown in FIG. 5, the seal body 71 is arranged on the inner side of the through hole 17a of the cover member 17. In other words, the seal body 71 is interposed between the through hole 17a and an outer peripheral surface 315a of an inner peripheral wall 315 extending backwards from an inner peripheral end of the front wall 313 of the rotor 3. The seal body 71 covers the entire front side of the roller clutch 51.

The main lip 73 is provided so that a lip end 73a faces the front wall 313 of the rotor 3 in the axial direction and contacts the rear surface 313b of the front wall 313. The main lip 73 is gradually extended in the axial direction towards the front wall 313 of the rotor 3, from the inner peripheral side to the outer peripheral side in the radial direction. The main lip 73 is in liquid-tight contact with the front wall 313 of the rotor 3 in the axial direction of the spool shaft 41.

While the lip end 73a of the main lip 73 is shown as overlapping with the front wall 313 in FIG. 5, the lip end 73a is in liquid-tight contact with the rear surface 313b of the front wall 313 in a curved position.

A contact portion on the front wall 313, where the lip end 73a of the main lip 73 is in contact with, is covered in the entire circumference by the annular wall portion 172 of the cover member 17 from the outer peripheral side.

The auxiliary lip 74 is arranged so as to be spaced apart from the main lip 73 on the outer peripheral side. The auxiliary lip 74 is provided so that a lip end 74a faces the rear surface 313b of the front wall 313 of the rotor 3 in the axial direction and contacts with or in proximity to a convex portion 313c that is convex backwards from the rear surface 313b of the front wall 313 (the auxiliary lip 74 is in close proximity to the convex portion 313c in FIG. 5). That is, a gap S1 having an approximately 0.5 mm dimension, for example, is formed between the lip end 74a of the auxiliary lip 74 and the convex portion 313c. The lip end 74a of the auxiliary lip 74 is located behind the lip end 73a of the main lip 73.

A grease holder 75 to hold grease 8 (lubricant) is provided in the region surrounded by the main lip 73 and the auxiliary lip 74 of the seal member 7 and the front wall 313 of the rotor 3.

The grease 8 is filled in the grease holder 75 through the gap S1 between the lip end 74a of the auxiliary lip 74 and the convex portion 313c of the front wall 313. The grease 8 is filled in the entire grease holder 75 and some of which may be filled into a region 76 between the auxiliary lip 74 and the annular wall portion 172. The type of the grease 8 as lubricant may be suitably selected.

Next, the operation of the waterproof structure and the spinning reel configured in this manner will be described in detail with reference to the drawings.

In this embodiment, as shown in FIGS. 3 and 5, the waterproof structure has the seal member 7 at the front of the cylinder-shaped cover member 17 in which the roller clutch 51 is housed. Therefore, it is possible to prevent water from seeping into inside of the roller clutch 51. In other words, in this embodiment, the main lip 73 of the seal member 7 and the rotor 3 are brought into liquid-tight contact in the axial direction, and the annular wall portion 172 of the cover member 17, provided on the outer peripheral side of the contact portion thereof, forms a labyrinth. Accordingly, water pressure is less likely to act on the main lip 73. That is, by bringing the main lip 73 and the rotor 3 into axial contact with each other, the contact pressure does not significantly change even when displacement occurs therebetween, therefore, there is no need to increase elastic deformation amount of the lip.

In this manner, it is possible to suppress the increase in torque acting on the spinning reel 1, thereby reducing torque.

Also, this embodiment does not require accuracy in centering of the seal member 7 while assembling the reel, as in the conventional case where the main lip 73 of the seal member 7 makes contact in the radial direction, and it is thus possible to prevent problems such as decreased waterproof property when the seal member 7 deviates from the predetermined position. Accordingly, the assembly efficiency can be improved.

Additionally, in this embodiment, the seal member 7 has the auxiliary lip 74 extending in the axial direction of the spool shaft 41 with a gap against the front wall 313 between the contact portion of the seal member 7 and the front wall 313 of the rotor 3, and the annular wall portion 172. Therefore, water pressure becomes even more difficult to act on the main lip 73, and thus, waterproof performance can be improved.

In addition, in the waterproof structure according to this embodiment, the main lip 73 and the auxiliary lip 74 are provided to the seal member 7, and the grease 8 is filled in the region surrounded by the rotor 3. Therefore, it is possible to increase rotation efficiency and reduce torque, thereby, waterproof performance can be improved.

Moreover, in this embodiment, by treating the surface of the annular wall portion 172 with a water-repellent finish, it is possible to prevent water from seeping into the inner peripheral side due to the water-repellent effect of the annular wall portion 172, and water pressure can be made even more difficult to act on the main lip 73.

Furthermore, in this embodiment, the main lip 73 is gradually extended in the axial direction towards the front wall 313 of the rotor 3, from the inner peripheral side to the outer peripheral side in the radial direction. Also, the lip end 73a of the main lip 73, i.e., the position contacting with the rotor 3, is arranged towards the outer peripheral side than the base end, therefore, water pressure resistance of the main lip 73 can be increased.

In this embodiment, since the sealing of the lip seal part in the waterproof structure has the greatest impact on torque improvement, it is possible to achieve low torque in that part of the structure.

With the waterproof structure and the spinning reel 1 according to this embodiment, configured as described above, it is possible to suppress the increase in torque, due to the waterproof seal, acting on the spinning reel 1 by suppressing the influence of displacement and reducing water pressure acting on the main lip 73 itself, thereby reducing torque.

The above-described embodiment of the waterproof structure and the spinning reel according to the present invention is presented as an example and is not intended to limit the scope of the invention. The embodiment can be implemented in various other forms, and various omissions, substitutions, and changes can be made to the extent that they do not depart from the gist of the invention. Embodiments and variations thereof include, for example, those that can be readily assumed, those that are substantially identical, and those that are of equal scope.

For example, in this embodiment, as a component of the seal member 7, the auxiliary lip 74 is provided between the main lip 73 and the annular wall portion 172, however, it is possible to omit the auxiliary lip 74.

Also, in this embodiment, the cover member 17 is provided as a cylindrical member to which the annular wall portion is provided, however, it is not limited to the cover member 17. For example, it is possible to have a configuration in which the cover member 17 is omitted and the tubular portion 14 protruding forward of the reel body 11 is the cylindrical member. Also, it is possible to provide the annular wall portion in the tubular portion 14. The waterproof structure just needs to be able to prevent water from seeping into the interior of the cylindrical member that houses the rotor drive mechanism 5, such as the roller clutch 51, from inside of the rotor 3.

Additionally, in this embodiment, the grease 8 (lubricant) is filled in the region (grease holder 75) surrounded by the main lip 73, the auxiliary lip 74, and the rotor 3. However, it is possible to omit the lubricant. Moreover, regarding the region to be filled by the lubricant, it is not limited to the region of the above-described grease holder 75. It is also possible to fill the lubricant in the region between the auxiliary lip 74 and the annular wall portion 172, for example.

In addition, in this embodiment, the annular wall portion 172 is provided on the cover member 17 which is a cylindrical member. However, the part to which the annular wall portion is provided does not have to be limited to a cylindrical member and the annular wall portion may be provided on a part of the rotor 3. In other words, the annular wall portion provided on the rotor 3 is arranged to protrude backward from the front wall 313 of the rotor 3 in the axial direction, for example, and cover the contact portion where the main lip 73 contacts in the entire circumference from the outer peripheral side.

Also, in this embodiment, the annular wall portion 172 is arranged to enter the recessed groove 314 formed to be annularly recessed into the rear surface 313b of the front wall 313 of the cylindrical portion 310 in the rotor 3 and form a labyrinth structure. However, it is not limited to the configuration in which the recessed groove 314 is arranged on the front wall 313 and the recessed groove 314 may not be formed.

Furthermore, the surface of the annular wall portion 172 is water-repellent in this embodiment, however, it is not limited to this.

Also, as for the shape of the main lip 73, in this embodiment, it is shaped to be gradually extended in the axial direction towards the front wall 313 of the rotor 3, from the inner peripheral side to the outer peripheral side in the radial direction. However, it is not limited to such a tilted shape.

Moreover, in this embodiment, the rotor body 31 (front wall 313) is the contact portion which the main lip 73 is in contact with, however, it is not limited to the rotor body 31 and the main lip 73 may be in contact with another member which integrally rotates with the rotor 3.

Additionally, other configurations, such as the shape and size of the reel body 11, the handle 2, the rotor 3, and the spool 4, may be changed as needed.

REFERENCE SIGNS LIST

1 Spinning reel
2 Handle

3 Rotor
4 Spool
5 Rotor drive mechanism
7 Seal member
8 Grease (lubricant)
10 Reel main body
11 Reel body
16 Pinion gear
17 Cover member (cylindrical member)
31 Rotor body
41 Spool shaft
53 Attachment plate
71 Seal body
72 Seal base end
73 Main lip
74 Auxiliary lip
75 Grease holder
313 Front wall
314 Recessed groove
172 Annular wall portion

What is claimed is:

1. A waterproof structure for a spinning reel including a reel main body, a cylindrical member disposed on an outer periphery of a spool shaft and a rotor disposed at a front of the cylindrical member in the reel main body, the waterproof structure comprising:
   a seal member configured to waterproof an entire circumference in an area between the cylindrical member and the rotor, the seal member including a main lip that is in liquid-tight contact at a contact portion in an axial direction of the spool shaft; and
   an annular wall portion disposed on one of the rotor or the cylindrical member, the annular wall portion configured to cover the contact portion along an entire circumference of an outer peripheral side of the contact portion;
   wherein the seal member further includes an auxiliary lip extending in the axial direction of the spool shaft with a gap axially provided between the cylindrical member and the rotor, the auxiliary lip disposed radially between the contact portion and the annular wall portion.

2. The waterproof structure according to claim 1, wherein lubricant is filled in a region surrounded by the main lip, the auxiliary lip, and the rotor.

3. The waterproof structure according to claim 1, wherein a surface of the annular wall portion is water-repellent.

4. The waterproof structure according to claim 1, wherein the main lip extends gradually from a radially inner side to a radially outer side towards the rotor in the axial direction.

5. The waterproof structure according to claim 1, wherein the cylindrical member has the annular wall portion,
   the rotor has an annular recessed groove, and
   at least part of the annular wall portion is disposed in the annular recessed groove.

6. The waterproof structure according to claim 1, wherein the cylindrical member has a through hole through which the spool shaft is inserted, and
   the seal member further includes a seal body disposed in the through hole of the cylindrical member.

7. The waterproof structure according to claim 6, wherein the main lip extends from the seal body.

8. A spinning reel comprising:
   a reel main body;
   a spool including a spool shaft extending in an axial direction;
   a cylindrical member disposed on an outer periphery of the spool shaft;
   a rotor disposed at a front of the cylindrical member; and
   a waterproof structure including a seal member configured to waterproof an entire circumference in an area between the cylindrical member and the rotor, the seal member including a main lip that is in liquid-tight contact at a contact portion in the axial direction,
   wherein at least one of the rotor or the cylindrical member has an annular wall portion, the annular wall portion configured to cover the contact portion along an entire circumference of an outer peripheral side of the contact portion; and
   wherein the seal member further includes an auxiliary lip extending in the axial direction of the spool shaft with a gap axially provided between the cylindrical member and the rotor, the auxiliary lip disposed radially between the contact portion and the annular wall portion.

9. A waterproof structure for a spinning reel including a reel main body, a cylindrical member disposed on an outer periphery of a spool shaft and a rotor disposed at a front of the cylindrical member in the reel main body, the waterproof structure comprising:
   a seal member configured to waterproof an entire circumference in an area between the cylindrical member and the rotor, the seal member including a main lip that is in liquid-tight contact at a contact portion in an axial direction of the spool shaft; and
   an annular wall portion disposed on one of the rotor or the cylindrical member, the annular wall portion configured to cover the contact portion along an entire circumference of an outer peripheral side of the contact portion;
   wherein the main lip extends gradually from a radially inner side to a radially outer side towards the rotor in the axial direction.

10. A spinning reel comprising:
   a reel main body;
   a spool including a spool shaft extending in an axial direction;
   a cylindrical member disposed on an outer periphery of the spool shaft;
   a rotor disposed at a front of the cylindrical member; and
   a waterproof structure including a seal member configured to waterproof an entire circumference in an area between the cylindrical member and the rotor, the seal member including a main lip that is in liquid-tight contact at a contact portion in the axial direction,
   wherein at least one of the rotor or the cylindrical member has an annular wall portion, the annular wall portion configured to cover the contact portion along an entire circumference of an outer peripheral side of the contact portion; and
   wherein the main lip extends gradually from a radially inner side to a radially outer side towards the rotor in the axial direction.

* * * * *